United States Patent
Hou et al.

(10) Patent No.: US 12,393,162 B1
(45) Date of Patent: Aug. 19, 2025

(54) METHOD FOR CALIBRATING SUBSTRATE ERRORS OF COMPUTER-GENERATED HOLOGRAM BASED ON RAY PROPAGATION IN THREE-DIMENSIONAL MODEL STATEMENT OF GOVERNMENT INTEREST

(71) Applicant: Institute of Optics and Electronics, Chinese Academy of Sciences, Chengdu (CN)

(72) Inventors: Xi Hou, Chengdu (CN); Shuai Zhang, Chengdu (CN); Xiaochuan Hu, Chengdu (CN); Qiang Chen, Chengdu (CN)

(73) Assignee: Institute of Optics and Electronics, Chinese Academy of Sciences, Chengdu (CN)

( * ) Notice: Subject to any disclaimer, the term of this patent is extended or adjusted under 35 U.S.C. 154(b) by 0 days.

(21) Appl. No.: 18/915,937

(22) Filed: Oct. 15, 2024

(30) Foreign Application Priority Data

Jun. 6, 2024 (CN) .......................... 202410727248.1

(51) Int. Cl.
*G03H 1/02* (2006.01)
*G03H 1/08* (2006.01)

(52) U.S. Cl.
CPC ................ *G03H 1/0808* (2013.01)

(58) Field of Classification Search
CPC ..................................................... G03H 1/0808
USPC ............................................................. 359/9
See application file for complete search history.

(56) References Cited

U.S. PATENT DOCUMENTS

| | | | | |
|---|---|---|---|---|
| 2003/0223081 | A1* | 12/2003 | Freimann | G01B 9/02072 356/512 |
| 2015/0198438 | A1* | 7/2015 | Hetzler | G01B 11/2441 356/458 |

* cited by examiner

*Primary Examiner* — Audrey Y Chang
(74) *Attorney, Agent, or Firm* — Seed IP Lap Group LLP

(57) ABSTRACT

The present invention relates to a method for calibrating computer-generated hologram substrate errors based on a ray propagation in three-dimensional model, which belongs to the application of holography in optical measurement. The calibration method mainly includes the following two steps: firstly, establishing a corresponding ray propagation in three-dimensional model according to an aspheric interference optical path with a computer-generated hologram; then, obtaining data of the shapes of the front and the rear surfaces and the thickness uniformity of the computer-generated hologram through a multi-surface measurement technology; and finally, calculating the substrate error of the computer-generated hologram by combining the ray propagation in three-dimensional model and the measurement data. Compared with the prior art, the present invention establishes a complete ray propagation in three-dimensional model in the aspheric interference measurement optical path to achieve the high-accuracy calibration of the computer-generated hologram substrate errors and improve the surface interference measurement accuracy with computer-generated hologram.

4 Claims, 3 Drawing Sheets

METHOD FOR CALIBRATING SUBSTRATE ERRORS OF COMPUTER-GENERATED HOLOGRAM BASED ON RAY PROPAGATION IN THREE-DIMENSIONAL MODEL STATEMENT OF GOVERNMENT INTEREST

BACKGROUND

Technical Field

The present invention belongs to the application field of holography and relates to a method for calibrating substrate errors of computer-generated hologram based on a ray propagation in three-dimensional model.

Description of the Related Art

The aspheric measurement method using computer-generated holograms is currently the most suitable method to achieve large-deviation high-accuracy aspheric surface shape measurement. The computer-generated hologram is a diffractive optical element, which transforms the measured wavefront into an ideal aspheric wavefront according to the diffraction principle, so as to achieve the null measurement. A wavefront error caused by computer-generated hologram base surface shape errors is one of the main factors that affect the measurement accuracy. At present, the transmission wavefront error of the computer-generated hologram substrate is calibrated by a collimating optical path method and a zero-order compensation method generally. However, the ray propagation trajectory in the two methods is obviously different from the ray trajectory in the actual measurement light path, and the calibration result will have a large calibration residual error. The substrate error of the computer-generated hologram has significant influence on the aspheric measurement accuracy. Therefore, how to achieve accurate calibration of the computer-generated hologram substrate error is a main problem of aspheric interferometry with the computer-generated hologram.

BRIEF SUMMARY

To solve the above technical problems, the present invention provides a method for calibrating computer-generated hologram substrate errors based on a ray propagation in three-dimensional model, which establishes a complete ray propagation in three-dimensional model in an aspheric interference measurement optical path to achieve the high-accuracy calibration of the computer-generated hologram substrate errors and improve the surface interference measurement accuracy with computer-generated hologram.

To achieve the above purpose, the present invention adopts the following technical solution:

A method for calibrating computer-generated hologram substrate errors based on a ray propagation in three-dimensional model includes the following steps:

step 1, establishing matched ray propagation in three-dimensional models according to different aspheric measurement optical paths;

step 2, measuring errors of a front and a rear surfaces and thickness uniformity of a computer-generated hologram substrate to calibrate substrate errors of a computer-generated hologram according to the ray propagation in three-dimensional models.

Further, the step 1 includes:

step 1.1, according to a specific measurement optical path, confirming the F number of a standard spherical lens used and the radius of curvature of a reference sphere, a distance between a non-holographic surface of a computer-generated hologram and a focus of a standard spherical lens, the thickness and refractive index of the computer-generated hologram substrate, and a distance between a holographic surface of the computer-generated hologram and an aspheric surface;

step 1.2, defining a mode of emitting rays: emitting the rays from the focus O of the selected standard spherical lens, and making the rays in a propagation process satisfy:

$$r_i(x,y,p) = pN_i(x,y) + P_i(x_i, y_i, p_i);$$

where ray $r_i$ represents that the ith segment ray propagates along a direction $N_i(x, y)$ of the ith segment and passes through a point $P_i$; p is a distance in which the ray propagates in the optical path; x, y represents a spatial coordinate of the ray when propagating in a free space; and $x_i$, $y_i$, $P_i$ represents a spatial coordinate of the point $P_i$ through which the ith segment ray propagates in the free space;

step 1.3, calculating a propagation trajectory of the ray in the measurement optical path;

after the ray is refracted through the non-holographic surface of the computer-generated hologram, a propagation direction is:

$$N_1(x, y) = (\alpha_1, \beta_1, \gamma_1)$$
$$= eN_0(x, y) - [eC_{0,f} + D_{0,f}]N_f(x, y);$$

where $N_0$ is an incident direction of the ray; e is a ratio of the refractive indexes of an incident space and an emitting space; $(\alpha_1, \beta_1, \gamma_1)$ is the cosine of an angle between a vector of the ray propagation direction and a Cartesian coordinate axis; and $C_{0,f}$, $D_{0,f}$ are intermediate constants, which satisfy the following relation:

$$\begin{cases} C_{0,f} = dot(N_0, N_f) \\ D_{0,f} = \sqrt{1 - e^2(1 - C_{0,f}^2)} \end{cases};$$

where dot represents a dot product between vectors;
$N_f(x, y)$ is a surface normal of the non-holographic surface at (x,y), expressed as:

$$N_f(x, y) = \frac{1}{\sqrt{(\partial F/\partial x)^2 + (\partial F/\partial y)^2 + 1}}\left(-\frac{\partial F}{\partial x}, -\frac{\partial F}{\partial y}, 1\right);$$

where F is a surface equation;
after the ray propagates to the holographic surface of the computer-generated hologram and is diffracted, the propagation direction of the diffracted ray of +1 level satisfies:

$$N_2(x, y) = eN_0(x, y) - N_h(x, y)[eC_{0,h} + D_{0,h}] + \frac{2\pi}{\lambda}\left(\frac{\partial \Phi(x, y)}{\partial x}, \frac{\partial \Phi(x, y)}{\partial y}, 0\right);$$

where $N_h(x, y)$ is a surface normal of the holographic surface at (x,y), $\Phi$ is an equivalent phase equation of the computer-generated hologram, and λ is a wavelength; and $C_{0,h}$, $D_{0,h}$ are intermediate constants, which satisfy the following relation:

$$\begin{cases} C_{0,h} = dot(N_0, N_h) \\ D_{0,h} = \sqrt{1 - e^2(1 - C_{0,h}^2)} \end{cases};$$

the propagation direction of the ray after propagating to the aspheric surface (x,y) and is reflected satisfies:

$N'(x,y) = N_0 - 2[N_0 \cdot \mathbf{N}_\alpha(x,y)] N_\alpha(x,y);$ where N'(x, y) represents the propagation direction of the ray after reflection at the aspheric surface; and $N_\alpha$ (x, y) is a surface normal of the aspheric surface at (x, y);

step 1.4, calculating a coordinate P of an intersection of the emitted ray on the surface of the ith medium:

$$\begin{cases} x_i = x_{i-1} + \alpha_i p_i \\ y_i = y_{i-1} + \beta_i p_i \end{cases};$$

where $\alpha_i$ and $\beta_i$ are the cosine components of the propagation directions of the ray after passing through the previous surface, and $x_{i-1}$, $y_{i-1}$ is the coordinate of the intersection $P_{i-1}$ of the ray at the previous surface.

Further, the step 2 includes:

step 2.1, obtaining the shapes of the front and the rear surfaces and the uniformity errors of thickness of the computer-generated hologram in a working condition;

step 2.2, according to the ray propagation in three-dimensional model and the measurement results of the front and the rear surfaces and the thickness uniformity of the computer-generated hologram in step 1, calculating a propagation trajectory of the ray from any field of view coming from the focus of the standard spherical lens in the optical path, and calculating a difference from a propagation trajectory in an ideal condition to obtain an optical path difference ΔOPD caused by the substrate error of the computer-generated hologram; and meanwhile, recording the intersection of the ray in the computer-generated hologram;

step 2.3, according to the intersection of the ray in the computer-generated hologram, calculating an additional diffraction wave aberration ΔW caused by the deviation of the propagation trajectory of the ray on the holographic surface of the computer-generated hologram:

$$\Delta W(x_1' + \Delta x_1, y_1' + \Delta y_1) = \frac{\partial \Phi(x_1', y_1')}{\partial x} \Delta x_1 + \frac{\partial \Phi(x_1', y_1')}{\partial y} \Delta y_1;$$

where ($x'_1$, $y'_1$) represents an ideal position coordinate of the ray on the computer-generated hologram, and $\Delta x_1$ and $\Delta y_1$ are deviations of the ray between an actual position and a theoretical position of the computer-generated hologram;

step 2.4, calculating a measurement wave aberration ΔR caused by the substrate error of the computer-generated hologram:

$$\Delta R = \frac{2\pi}{\lambda} \Delta OPD + \Delta W + \Delta W';$$

where ΔW and ΔW' are additional diffraction wave aberrations caused by that the ray penetrates through the holographic surface of the computer-generated hologram for the first and second times respectively.

Further, the ray propagation in three-dimensional model is used for calculating a coaxial aspheric measurement optical path, or an off-axis aspheric measurement optical path.

Further, in the step 2.1, the surface shape of the front and the rear surfaces and thickness uniformity of the computer-generated hologram under the working condition are measured directly by a wavelength tuning interferometer, or the surface shape of the front and the rear surfaces and thickness uniformity of the computer-generated hologram under the working condition are obtained by an absolute measurement method of planarity and inhomogeneity with modified six-step method.

Further, in the step 2, the measurement wave aberration caused by the substrate error of the computer-generated hologram includes the optical path difference caused by different propagation trajectories of the ray in the optical path, and further includes the additional diffraction wave aberration caused by the deviation of the propagation trajectories of the ray.

Compared with the prior art, the present invention has the following beneficial effects:

(1) The present invention calibrates the substrate error by establishing a complete ray propagation in three-dimensional model of the aspheric measurement optical path. The method not only is applicable to the aspheric coaxial optical path, but also can be used for the aspheric off-axis optical path.

(2) The present invention reproduces the propagation trajectory of the ray in the measurement optical path so as to achieve accurate calibration of the substrate error of the computer-generated hologram, and overcomes the calibration residual error caused by the difference between the propagation trajectory of the ray and the propagation of the ray in the aspheric measurement optical path in the classical method.

Wherein, 301—non-holographic surface, and 302—holographic surface

DETAILED DESCRIPTION

A typical embodiment of the present invention is described in detail below, and the present invention is further described in detail. It is necessary to indicate here that the following embodiments are only used for further illustrating the method, and not intended to limit the protection scope of the method. Some non-essential improvements and adjustments made to the method by those skilled in the art according to the above contents of the method shall also belong to the protection scope of the present invention.

Figure 1:
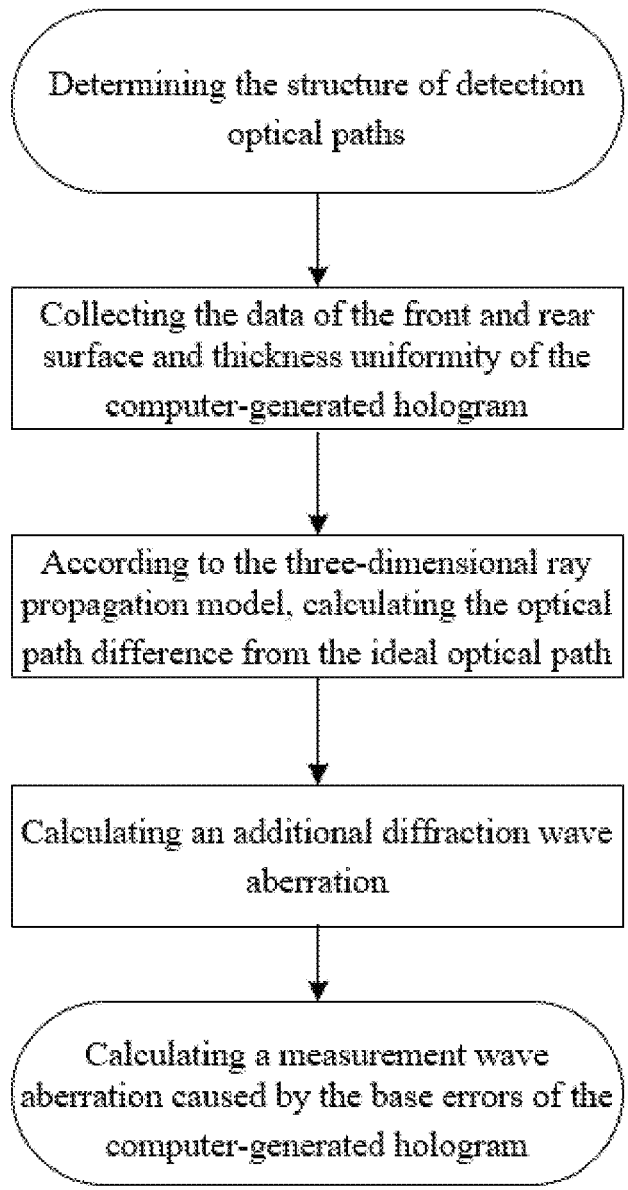
FIG. 1 is a flow chart of a method for calibrating computer-generated hologram substrate errors based on a ray propagation in three-dimensional model proposed by the present invention.

As shown in FIG. 1, a method for calibrating computer-generated hologram substrate errors based on a ray propagation in three-dimensional model in the present invention includes two steps of establishing a ray propagation in three-dimensional model for measurement optical paths and calibrating substrate errors of a computer-generated hologram, specifically including determining the structure of optical paths, collecting the data of the front and rear surface and thickness uniformity of the computer-generated hologram substrate, calculating the optical path difference from the ideal optical path based on the ray propagation in three-dimensional model, calculating the additional diffraction wave aberration and calculating the measurement wave aberration caused by the substrate errors of the computer-generated hologram.

Figure 2:
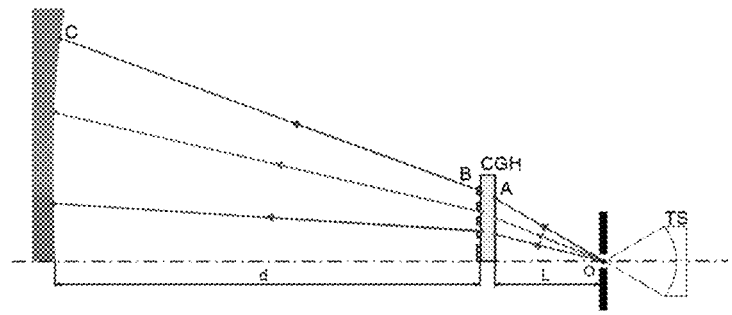
FIG. 2 is a schematic diagram of an aspheric interferometric optical path in an embodiment of the present invention.

Establishing a ray propagation in three-dimensional model for measurement optical paths specifically includes the following steps:

Step a: according to a specific optical path, confirming the F number of a standard spherical lens used and the radius of curvature of a reference spherical surface, a distance between a non-holographic surface of a computer-generated hologram and a focus of a standard spherical lens, the thickness and refractive index of the computer-generated hologram substrate, and a distance between a holographic surface of the computer-generated hologram and an aspheric surface. The schematic diagram of an aspheric interferometric optical path is shown in FIG. 2. The ray is emitted from the selected standard spherical lens TS, converges to the focus O, then propagates to the CGH non-holographic surface A at the distance L from the focus, and is refracted. After the refracted ray passes through and diffracts at the holographic surface B, the ray propagates to the aspheric surface C at the holographic surface d of CGH, and is reflected back to the standard spherical lens.

Step b: defining a mode of emitting rays: emitting the rays from the focus O of the selected standard spherical lens (TS), and making the rays in a propagation process satisfy:

$$r_i(x,y,p) = pN_i(x,y) + P_i(x_i, y_i, p_i);$$

where ray $r_i$ represents that the ith segment ray propagates along a direction $N_i$ (x, y) of the ith segment and passes through a point $P_i$; P is a distance in which the ray propagates in the optical path; x, y represents a spatial coordinate of the ray when propagating in a free space; and $x_i$, $y_i$, $p_i$ represents a spatial coordinate of the point $P_i$ through which the ith segment ray propagates in the free space.

Step c: calculating a propagation trajectory of the ray in the optical path, wherein after the ray is refracted through the non-holographic surface of the computer-generated hologram, a propagation direction is:

$$N_1(x, y) = (\alpha_1, \beta_1, \gamma_1)$$
$$= eN_0(x, y) - [eC_{0,f} + D_{0,f}]N_f(x, y);$$

where $N_0$ is an incident direction of the ray; e is a ratio of the refractive indexes of an incident space and an emitting space; $(\alpha_1, \beta_1, \gamma_1)$ is the cosine of an angle between a vector of the ray propagation direction and a Cartesian coordinate axis; and $C_{0,f}$, $D_{0,f}$ are intermediate constants which satisfy the following relation:

$$\begin{cases} C_{0,f} = \text{dot}(N_0, N_f) \\ D_{0,f} = \sqrt{1 - e^2(1 - C_{0,f}^2)} \end{cases};$$

where dot represents a dot product between vectors;
$N_f$ (x, y) is a surface normal of the non-holographic surface at (x,y), expressed as:

$$N_f(x, y) = \frac{1}{\sqrt{(\partial F/\partial x)^2 + (\partial F/\partial y)^2 + 1}}\left(-\frac{\partial F}{\partial x}, -\frac{\partial F}{\partial y}, 1\right);$$

where F is a surface equation. After the ray propagates to the holographic surface of the computer-generated hologram and is diffracted, the propagation direction of the diffracted ray of +1 level satisfies:

$$N_2(x, y) = eN_0(x, y) - N_h(x, y)[eC_{0,h} + D_{0,h}] + \frac{2\pi}{\lambda}\left(\frac{\partial \Phi(x, y)}{\partial x}, \frac{\partial \Phi(x, y)}{\partial y}, 0\right);$$

where $N_h$ (x, y) is a surface normal of the holographic surface at (x,y), $\Phi$ is an equivalent phase equation of the computer-generated hologram, and λ is a wavelength; and $C_{0,h}$, $D_{0,h}$ are intermediate constants, which satisfy the following relation:

$$\begin{cases} C_{0,h} = \text{dot}(N_0, N_h) \\ D_{0,h} = \sqrt{1 - e^2(1 - C_{0,h}^2)} \end{cases};$$

the propagation direction of the ray after propagating to the aspheric surface and is reflected satisfies:

$$N'(x,y) = N_0 - 2[(N_0 \square N_\alpha(x,y)]N_\alpha(x,y);$$

where N'(x, y) represents the propagation direction of the ray after reflection at the aspheric surface; and $N_\alpha$ (x, y) is a surface normal of the aspheric surface at (x, y)).

Step d: calculating a coordinate $P_i$ of an intersection of the emitted ray on the surface of the ith medium:

$$\begin{cases} x_i = x_{i-1} + \alpha_i p_i \\ y_i = y_{i-1} + \beta_i p_i \end{cases};$$

where $p_i$ is the distance that the ray propagates between two adjacent surfaces, $\alpha_i$ and $\beta_i$ are the cosine components of the propagation directions of the ray after passing through the previous surface, and $x_{i-1}$, $y_{i-1}$ is the coordinate of the intersection $P_{i-1}$ of the ray at the previous surface.

Figure 3A:
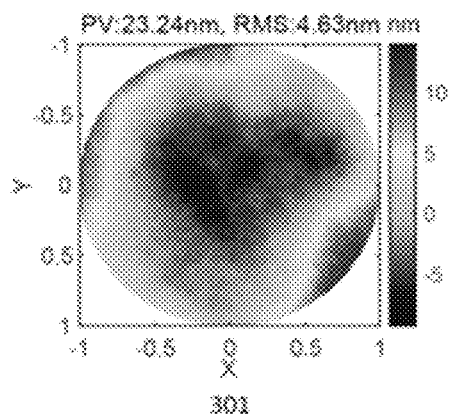
FIG. 3a is a schematic diagram of a surface shape error of a non-holographic surface of a computer-generated hologram base in an embodiment of the present invention.
Figure 3B:
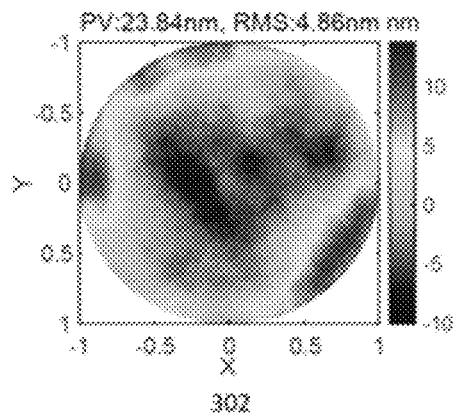
FIG. 3b is a schematic diagram of a surface shape error of a holographic surface of a computer-generated hologram base in an embodiment of the present invention.

Calibrating substrate errors of a computer-generated hologram includes the following steps:

Step a: measuring the surface shape of the front and the rear surfaces and thickness uniformity of the computer-generated hologram under the working condition directly by a wavelength tuning interferometer, or obtaining the surface shape and thickness uniformity errors of the front and the rear surfaces of the computer-generated hologram under the working condition by an absolute measurement method of planarity and inhomogeneity with modified six-step method. The above method is a well-known technique. FIG. 3a shows the schematic diagram of surface shape errors of a non-holographic surface 301 of the computer-generated hologram substrate in an embodiment of the present invention (peak valley value (PV): 23.24 nm, and root mean square (RMS): 4.63 nm). FIG. 3b shows the schematic diagram of surface shape errors of a holographic surface 302 of the computer-generated hologram substrate in an embodiment of the present invention (peak valley value (PV): 23.84 nm, and root mean square (RMS): 4.86 nm).

Step b: according to the ray propagation in three-dimensional model and the measurement results of the front and the rear surfaces and the thickness uniformity of the computer-generated hologram, calculating a propagation trajectory of the ray from any field of view coming from the focus of the standard spherical lens in the optical path, and calculating a difference from a propagation trajectory in an ideal condition to obtain an optical path difference $\Delta OPD$ caused by the substrate error of the computer-generated hologram; and meanwhile, recording the intersection of the ray in the computer-generated hologram;

Step c: according to the intersection of the ray in the computer-generated hologram, calculating an additional diffraction wave aberration $\Delta W$ caused by the deviation of the propagation trajectory of the ray on the holographic surface of the computer-generated hologram:

$$\Delta W(x'_1 + \Delta x_1, y'_1 + \Delta y_1) = \frac{\partial \Phi(x'_1, y'_1)}{\partial x}\Delta x_1 + \frac{\partial \Phi(x'_1, y'_1)}{\partial y}\Delta y_1;$$

where $(x'_1, y'_1)$ represents an ideal position coordinate of the ray on the computer-generated hologram, and $\Delta x_1$, $\Delta y_1$ are deviations of the ray between an actual position and a theoretical position of the computer-generated hologram.

Figure 4:
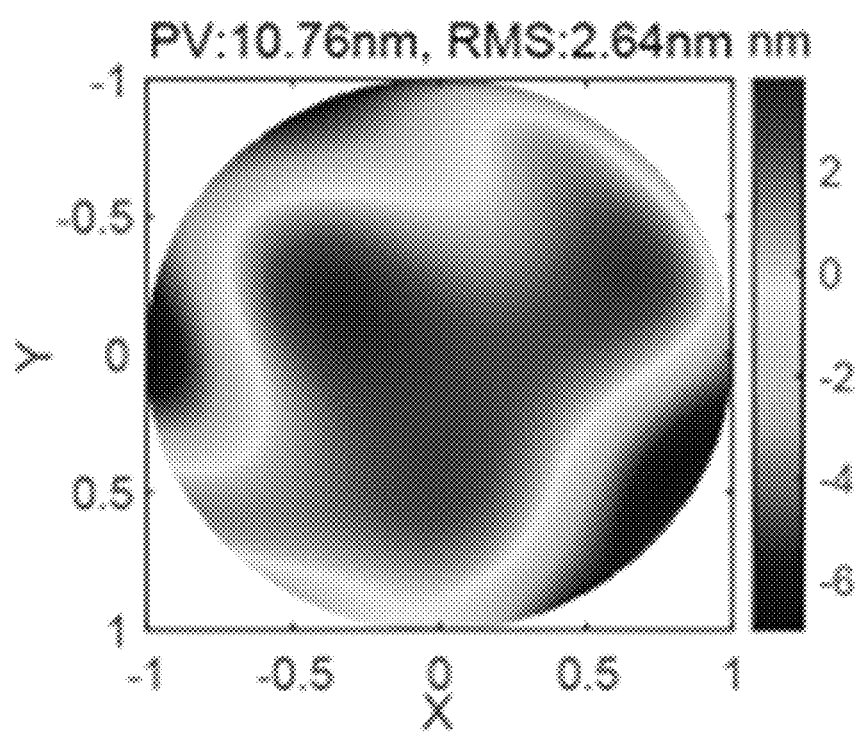
FIG. 4 is a schematic diagram of a calibration result of computer-generated hologram substrate errors in an embodiment of the present invention.

Step d: calculating a measurement wave aberration $\Delta R$ caused by the substrate error of the computer-generated hologram:

$$\Delta R = \Delta OPD + \Delta W + \Delta W';$$

where $\Delta W$ and $\Delta W'$ are additional diffraction wave aberrations caused by that the ray penetrates through the holographic surface of the computer-generated hologram for the first and second times respectively, as shown in FIG. 4.

The above only describes specific embodiments of the present invention, but the protection scope of the present invention is not limited thereto. Any change or replacement contemplated by those skilled in the art within the technical scope disclosed by the present invention shall be covered within the protection scope of the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for calibrating substrate errors of computer-generated hologram c based on a ray propagation in three-dimensional model, comprising the following steps:

step 1, establishing three-dimensional ray propagation models according to different optical paths, comprising:

step 1.1, according to an optical path, confirming an F number of a standard spherical lens used and a radius of a curvature of a reference spherical surface of the standard spherical lens, a distance between a non-holographic surface of a computer-generated hologram and a focus of the standard spherical lens, a thickness and a refractive index of a substrate of the computer-generated hologram, and a distance between a holographic surface of the computer-generated hologram and an aspheric surface;

step 1.2, defining a mode of emitting rays wherein a rays emits from a focus O of the standard spherical lens, and the ray in a propagation process satisfies:

$$r_i(x,y,p) = pN_i(x,y) + P_i(x_i,y_i,p_i);$$

where ray $r_i$ represents that in an ith segment of the ray, the ray propagates along a direction $N_i(x,y)$ of the ith segment and passes through a point $P_i$; p is a distance in which the ray propagates in the optical path; x, y represents a spatial coordinate of the ray when propagating in a free space; and $x_i$, $y_i$, $p_i$ represents a spatial coordinate of the point $P_i$ through which in the ith segment, the ray propagates in the free space;

step 1.3, calculating a propagation trajectory of the ray in the optical path;

after the ray is refracted through the non-holographic surface of the computer-generated hologram, a propagation direction is:

$$N_1(x, y) = (\alpha_1, \beta_1, \gamma_1)$$
$$= eN_0(x, y) - [eC_{0,f} + D_{0,f}]N_f(x, y);$$

where $N_0$ is an incident direction of the ray; e is a ratio of the refractive indexes of an incident space and an emitting space; $(\alpha_1, \beta_1, \gamma_1)$ is the cosine of an angle between a vector of a propagation direction of the ray and a Cartesian coordinate axis; and $C_{0,f}$, $D_{0,f}$ are intermediate constants which satisfy the following relation:

$$\begin{cases} C_{0,f} = dot(N_0, N_f) \\ D_{0,f} = \sqrt{1 - e^2(1 - C_{0,f}^2)} \end{cases};$$

where dot represents a dot product between vectors; $N_f(x,y)$ is a surface normal of the non-holographic surface at (x, y), expressed as:

$$N_f(x, y) = \frac{1}{\sqrt{(\partial F/\partial x)^2 + (\partial F/\partial y)^2 + 1}} \left(-\frac{\partial F}{\partial x}, -\frac{\partial F}{\partial y}, 1\right);$$

where F is a surface equation indicating a surface at which a surface normal is obtained;

after the ray propagates to the holographic surface of the computer-generated hologram and is diffracted, the propagation direction of the diffracted ray of +1 level satisfies:

$$N_2(x, y) = eN_0(x, y) - N_h(x, y)[eC_{0,h} + D_{0,h}] + \frac{2\pi}{\lambda}\left(\frac{\partial \Phi(x, y)}{\partial x}, \frac{\partial \Phi(x, y)}{\partial y}, 0\right);$$

where $N_h(x,y)$ is a surface normal of the holographic surface at (x,y), $\Phi$ is an equivalent phase equation of the computer-generated hologram, and $\lambda$ is a wavelength; and $C_{0,h}$, $D_{0,h}$ are intermediate constants, which satisfy the following relation:

$$\begin{cases} C_{0,h} = \text{dot}(N_0, N_h) \\ D_{0,h} = \sqrt{1 - e^2(1 - C_{0,h}^2)} \end{cases};$$

the propagation direction of the ray after reflection at the aspheric surface (x,y) satisfies:

$$N'(x,y) = N_0 - 2[N_0 \cdot N_0(x,y)]N_0(x,y);$$

where N'(x,y) represents the propagation direction of the ray after reflection at the aspheric surface; and $N_\alpha$ (x,y) is a surface normal of the aspheric surface at (x,y);

step 1.4, calculating a coordinate $P_i$ of an intersection of the ray on a surface of an ith medium:

$$\begin{cases} x_i = x_{i-1} + \alpha_i p_i \\ y_i = y_{i-1} + \beta_i p_i \end{cases};$$

where $\alpha_1$ and $\beta_1$ are the cosine components of the propagation directions of the ray after passing through a previous surface, and $x_{i-1}$, $y_{i-1}$ is the coordinate of the intersection $P_{i-1}$ of the ray at the previous surface;

step 2, obtaining surface shape errors of a front surface and a rear surface of the substrate of the computer-generated hologram, and thickness uniformity of the substrate of the computer-generated hologram to calibrate substrate errors of the computer-generated hologram based on the three-dimensional ray propagation models, comprising:

step 2.1, obtaining shapes of the front and the rear surfaces and the thickness uniformity of the computer-generated hologram in a working condition;

step 2.2, according to the three-dimensional ray propagation models and the measurement results of the front and the rear surfaces and the thickness uniformity of the computer-generated hologram in step 1, calculating a propagation trajectory of the ray from any field of view coming from the focus of the standard spherical lens in the optical path, and calculating a difference from a propagation trajectory in an ideal condition to obtain an optical path difference $\Delta$OPD caused by the substrate error of the computer-generated hologram; and meanwhile, recording the intersection of the ray in the computer-generated hologram;

step 2.3, according to the intersection of the ray in the computer-generated hologram, calculating an additional diffraction wave aberration $\Delta W$ caused by the deviation of the propagation trajectory of the ray on the holographic surface of the computer-generated hologram based on:

$$\Delta W(x_1' + \Delta x_1, y_1' + \Delta y_1) = \frac{\partial \Phi(x_1', y_1')}{\partial x}\Delta x_1 + \frac{\partial \Phi(x_1', y_1')}{\partial y}\Delta y_1;$$

where ($x'_1$, $y'_1$) represents an ideal position coordinate of the ray on the computer-generated hologram, and $\Delta x_1$ and $\Delta y_1$ are deviations of the ray between an actual position and a theoretical position of the computer-generated hologram;

step 2.4, calculating a measurement wave aberration $\Delta R$ caused by the substrate error of the computer-generated hologram based on:

$$\Delta R = \frac{2\pi}{\lambda}\Delta OPD + \Delta W + \Delta W';$$

where $\Delta W$ and $\Delta W'$ are additional diffraction wave aberrations caused by that the ray penetrates through the holographic surface of the computer-generated hologram for the first and second times respectively.

2. The method for calibrating computer-generated hologram substrate errors based on the three-dimensional ray propagation model according to claim 1, wherein the ray propagation in three-dimensional ray propagation model is used for calculating a coaxial aspheric measurement optical path, or an off-axis aspheric measurement optical path.

3. The method for calibrating computer-generated hologram substrate errors based on the ray propagation in three-dimensional model according to claim 1, wherein in the step 2.1, the surface shape errors of the front and the rear surfaces and thickness uniformity of the computer-generated hologram under the working condition are measured directly by a wavelength tuning interferometer, or the surface shape errors of the front and the rear surfaces and thickness uniformity of the computer-generated hologram under the working condition are obtained by an absolute method of planarity and inhomogeneity with modified six-step method.

4. The method for calibrating computer-generated hologram substrate errors based on the ray propagation in three-dimensional model according to claim 1, wherein in the step 2, the measurement wave aberration caused by the substrate error of the computer-generated hologram comprises the optical path difference caused by different propagation trajectories of the ray in the optical path, and further comprises the additional diffraction wave aberration caused by the deviation of the propagation trajectories of the ray.

* * * * *

UNITED STATES PATENT AND TRADEMARK OFFICE
CERTIFICATE OF CORRECTION

PATENT NO. : 12,393,162 B1
APPLICATION NO. : 18/915937
DATED : August 19, 2025
INVENTOR(S) : Xi Hou et al.

Page 1 of 1

It is certified that error appears in the above-identified patent and that said Letters Patent is hereby corrected as shown below:

In the Claims

Column 8, Claim 1, Line 14:
"hologram c based" should read: -- hologram based --.

Column 8, Claim 1, Line 29:
"emitting rays wherein" should read: -- emitting rays, wherein --.

Column 9, Claim 1, Line 19:
"and A is a" should read: -- and $\lambda$ is --.

Column 9, Claim 1, Line 44:
"$\alpha_1$ and $\beta_1$" should read: -- $\alpha_i$ and $\beta_i$ --.

Column 9, Claim 1, Line 49:
"generated hologram, and" should read: -- generated hologram and --.

Signed and Sealed this
Third Day of February, 2026

John A. Squires
*Director of the United States Patent and Trademark Office*